J. THISSEN.
RESILIENT TIRE.
APPLICATION FILED SEPT. 5, 1912.

1,126,129.

Patented Jan. 26, 1915.

2 SHEETS—SHEET 1.

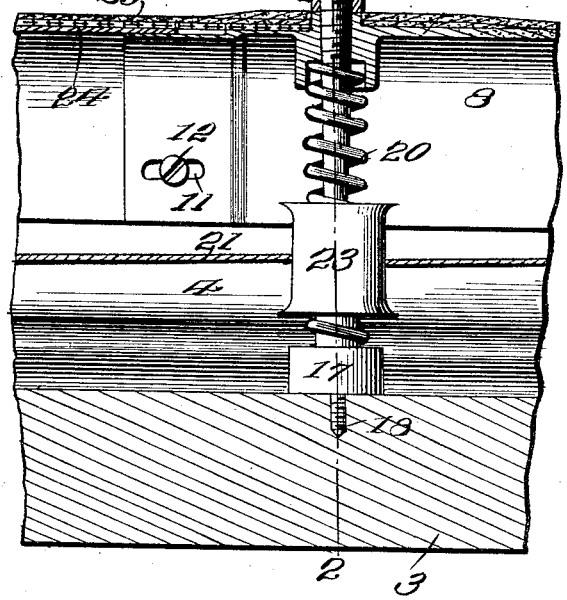
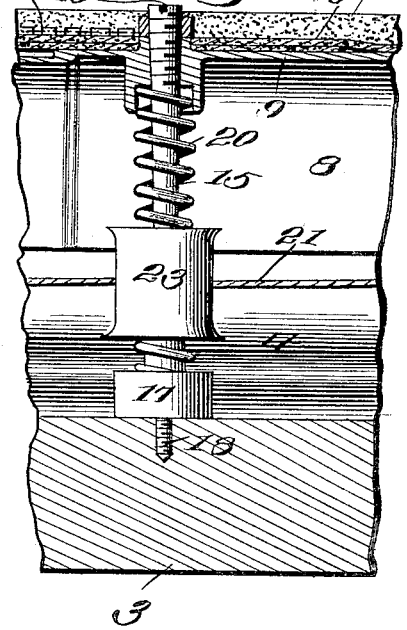
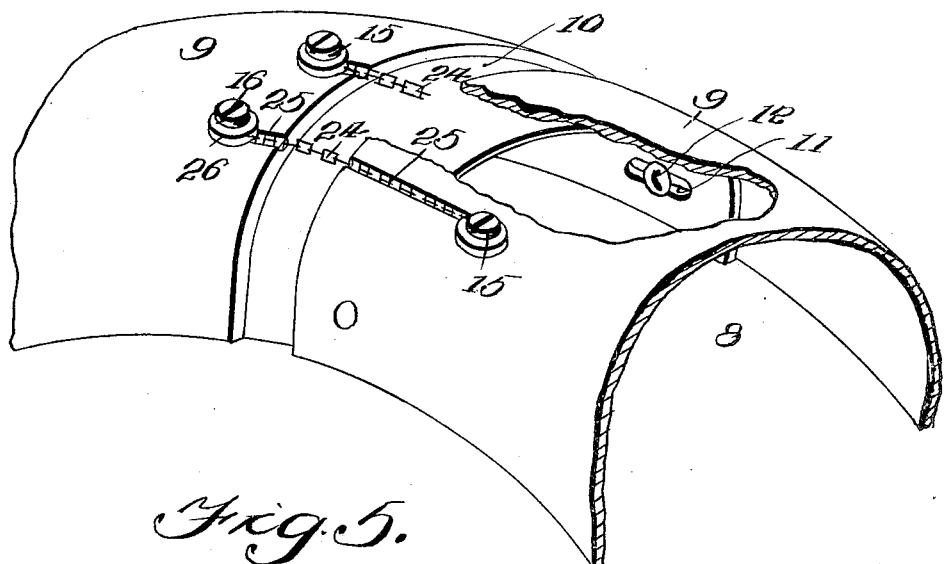

UNITED STATES PATENT OFFICE.

JACOB THISSEN, OF KANE, PENNSYLVANIA.

RESILIENT TIRE.

1,126,129.  Specification of Letters Patent.  Patented Jan. 26, 1915.

Application filed September 5, 1912. Serial No. 718,774.

*To all whom it may concern:*

Be it known that I, JACOB THISSEN, citizen of the United States, residing at Kane, in the county of McKean and State of Pennsylvania, have invented certain new and useful Improvements in Resilient Tires, of which the following is a specification.

My invention relates to vehicle tires and particularly to resilient tires, and the primary object of the invention is the provision of a simple, durable and efficient construction of tire having the characteristics of the ordinary pneumatic and cushion tires without, however, the liability of being punctured or otherwise damaged in service.

A further object is to improve upon the construction illustrated in my pending application, Serial No. 690,017, filed April 11, 1912, by simplifying said construction and rendering it better able to withstand jar and wear.

A still further object is to provide a tire, the outer covering of which is composed of a series of overlapping sections of rawhide, canvas, leather or like material detachably connected to the rim of the wheel so that they may be readily removed or replaced.

A further object is to provide in connection with a protective covering of the character described, an inner metallic rim or support for the outer covering which is resiliently held in spaced relation to the rim of the wheel.

A further object is to so form this metallic protective supporting sheath that it shall be composed of sections interlinked with each other so as to provide for flexibility in this inner support.

A still further object is to so construct the tire that it shall be provided with a plurality of radially projecting pins which shall project slightly beyond the outer face of the cover and form anti-skidding studs.

A further object is to connect the sections of the inner metallic sheath by means of links or chains connected to these studs so as to bind the sections of the sheath together while yet allowing them to have a certain flexibility and thus holding the sections in engagement with each other.

Other objects will appear in the course of the following description.

Figure 1:
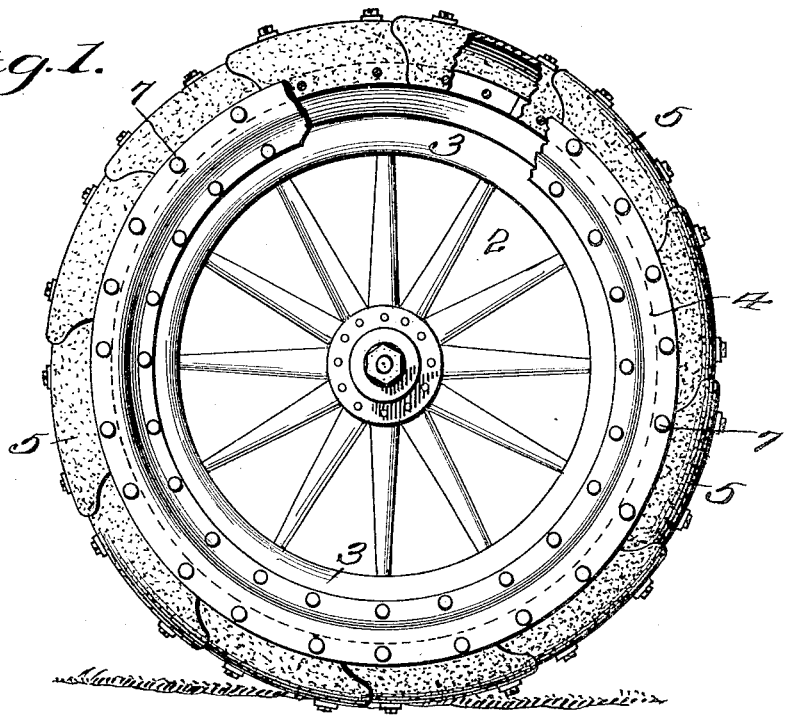
Figure 2:
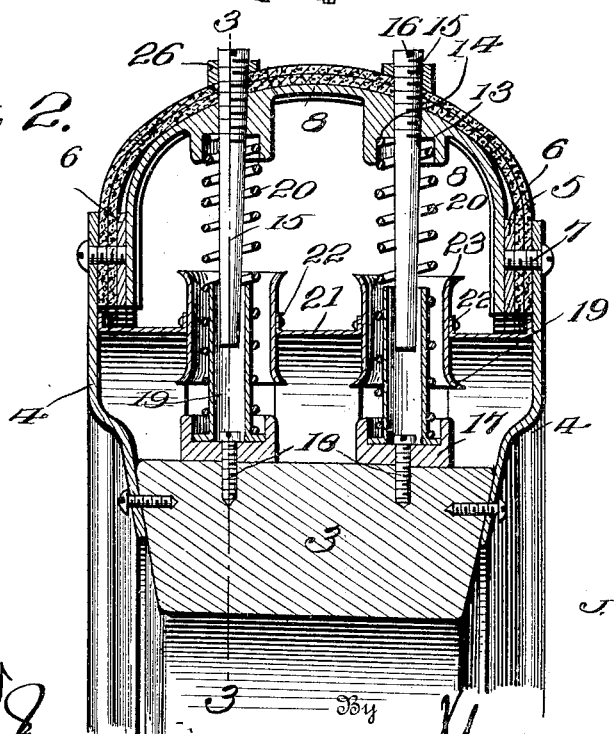

My invention is illustrated in the accompanying drawings wherein:

Figure 1 is a side elevation of a wheel constructed in accordance with my invention. Fig. 2 is a transverse section on the line 2—2 of Fig. 3, the guiding pins being shown in elevation. Fig. 3 is a fragmentary longitudinal section on the line 3—3 of Fig. 2. Fig. 4 is a like view to Fig. 3 but showing a modified arrangement. Fig. 5 is a perspective detail view of two of the sections of the inner sheath.

Corresponding and like parts are referred to in the following description and indicated in all the views of the accompanying drawings by the same reference characters.

Referring to these drawings, 2 designates a wheel of any ordinary construction provided with the usual radial spokes and having the rim 3. I do not wish to be limited to any particular formation for this wheel as it is obvious that my invention is equally applicable to many forms of wheel. Attached to each side face of the rim 3 is an annular plate 4 of sheet metal or like material which may be either in one entire piece or formed in sections as desired. Riveted or otherwise attached to the rings 4 are a plurality of sections 5 formed of leather, rawhide, canvas, rubber or any other suitable material, these sections together forming a covering for the rim of the wheel and providing a tread face for the tire. These sections overlap each other and are somewhat scaliform as illustrated in Fig. 1. That portion of each section or "scale" which is covered by the next adjacent sections or both of the overlapping portions of the sections or scales is reduced in thickness so as to leave the face of the tire practically flush and without projection as far as the tire cover goes. This is indicated in Fig. 3.

The sections 5 extend entirely around the rim of the wheel and the sections are connected to each other on opposite sides by means of the flat rings 6 which extend along the margins of the several sections 5. Screws or like devices 7 extend through the annular plate 4, the margins of the several sections 5 and through the ring plates 6 so as to connect the same together. The ring plates 6 act to reinforce the margins of the several sections and prevent the several sections from being torn away.

Mounted interiorly of the cover sections 5 and extending around the wheel is a supporting rim designated generally 8 and composed as illustrated in Fig. 5 of a plurality of interlinked sections 9. Each section conmay be readily removed when it is desired to replace them, but it will of course be obvious that the pins might be formed with a head so shaped as to be engaged by a wrench.

What I claim is:

1. The combination with a wheel rim or felly, of a plurality of sockets mounted on the wheel rim, outwardly projecting tubular members carried by the sockets, annular side plates attached to the rim, a flexible cover attached at its margins to said side plates, an outer rim composed of sections of sheet metal flexibly connected to each other and each formed with a plurality of bosses, each boss at its inner end being formed with a socket, springs carried in the sockets of the felly and the outer rim and surrounding said tubular member, screw-threaded pins passing through the bosses of the outer rim and surrounded by said springs, a circumferential web attached to the side plates, and a tubular member, one for each spring, carried by said web and surrounding the springs.

2. In a resilient wheel, the combination with a wheel rim, of a plurality of socket members mounted thereon, side plates connected to the rim, a transverse web extending between said side plates and extending concentric to the rim and having openings, a radially directed sleeve disposed within each opening, tubular members disposed in each socket and smaller in diameter than said sleeves and extending therethrough, an outer rim composed of a plurality of sections having limited movement with relation to each other, pins projecting inward from said sections, the inner end of each pin being disposed within a corresponding tubular member, and springs inclosing said outer sections and surrounding said pins and the tubular member and being disposed between the tubular member and the corresponding sleeve.

In testimony whereof I affix my signature in presence of two witnesses.

JACOB THISSEN. [L. S.]

Witnesses:
J. D. YOAKLEY,
FREDERIC B. WRIGHT.

Copies of this patent may be obtained for five cents each, by addressing the "Commissioner of Patents, Washington, D. C."